US008427342B2

(12) United States Patent
Busch

(10) Patent No.: US 8,427,342 B2
(45) Date of Patent: Apr. 23, 2013

(54) METHOD AND SYSTEM FOR LOCATING AN AVAILABLE VEHICLE PARKING SPACE

(75) Inventor: Alexander Busch, Sunnyvale, CA (US)

(73) Assignee: Bayerishe Motoren Werke Aktiengesellschaft, Munich (DE)

( * ) Notice: Subject to any disclaimer, the term of this patent is extended or adjusted under 35 U.S.C. 154(b) by 326 days.

(21) Appl. No.: 12/755,066

(22) Filed: Apr. 6, 2010

(65) Prior Publication Data

US 2011/0241898 A1 Oct. 6, 2011

(51) Int. Cl.
*B60Q 1/48* (2006.01)
*G08G 1/01* (2006.01)
*H04B 7/00* (2006.01)

(52) U.S. Cl.
USPC ........ 340/932.2; 340/933; 340/935; 455/41.2

(58) Field of Classification Search ............... 340/932.2, 340/933; 455/41.2
See application file for complete search history.

(56) References Cited

U.S. PATENT DOCUMENTS

| | | | | |
|---|---|---|---|---|
| 7,181,426 | B2 | 2/2007 | Dutta | |
| 7,239,252 | B2 * | 7/2007 | Kato | 340/932.2 |
| 2002/0029164 | A1 | 3/2002 | Sugar et al. | |
| 2004/0068433 | A1 | 4/2004 | Chatterjee et al. | |
| 2007/0198152 | A1 * | 8/2007 | Endo et al. | 701/41 |
| 2010/0302068 | A1 * | 12/2010 | Bandukwala | 340/932.2 |
| 2011/0298639 | A1 * | 12/2011 | Kadowaki et al. | 340/932.2 |

FOREIGN PATENT DOCUMENTS

WO WO 2009156428 A1 * 12/2009

* cited by examiner

*Primary Examiner* — Brian Zimmerman
*Assistant Examiner* — Laura Nguyen
(74) *Attorney, Agent, or Firm* — Barley Snyder

(57) ABSTRACT

A method and system of the invention locates an available vehicle parking space. In the method, parked information indicative of a parked condition is stored in a first vehicle. The first vehicle may detect a change in condition from the parked condition to a vacating condition. The first vehicle then communicates the change in condition from the first vehicle to a neighboring searching vehicle and the searching vehicle detects the change.

17 Claims, 4 Drawing Sheets

FIG. 2
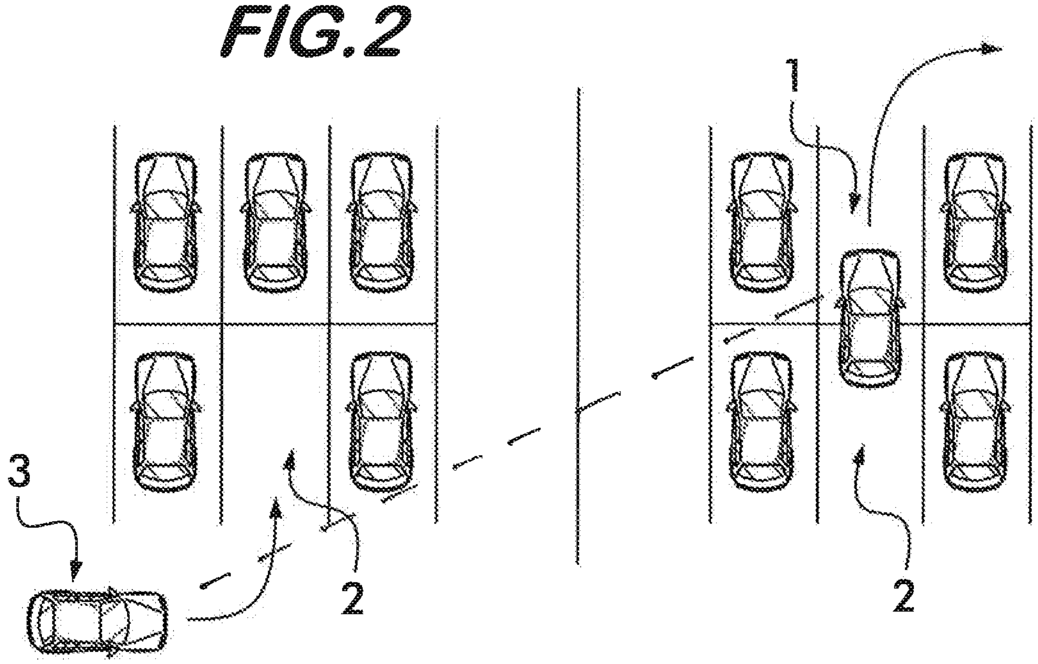
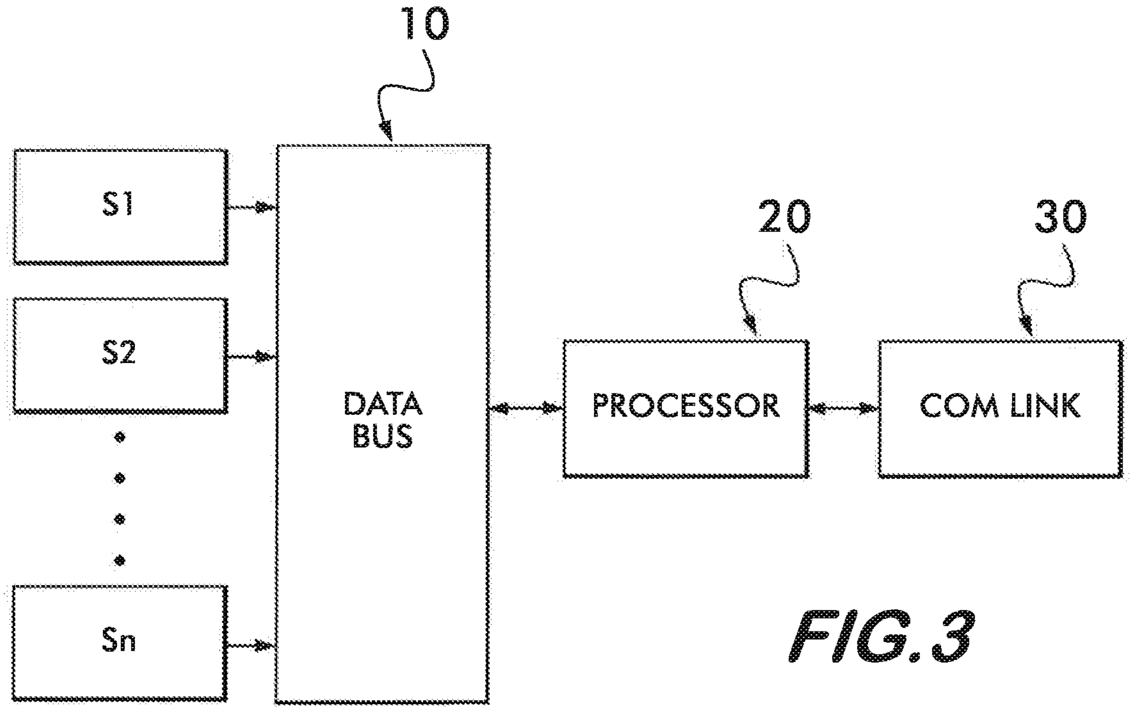
FIG. 3

METHOD AND SYSTEM FOR LOCATING AN AVAILABLE VEHICLE PARKING SPACE

FIELD OF THE INVENTION

The invention is related to a method and system for locating an available vehicle parking space.

BACKGROUND

In urban or other congested areas, finding a parking space for a vehicle can be a time consuming and challenging process. Especially in these areas, where vehicle congestion is ever increasing, various methods have been explored for easing the burden of finding a parking space. For example, systems have been installed in parking garages to alert incoming drivers to the direction and location of available parking spaces. Such systems require large investments in infrastructure since they include detectors at each space as well as lighted electronic signage to direct drivers through the garage. Other systems have been developed to allow drivers to reserve a space by an on line link to a centralized parking reservation system. These require a driver to make a reservation before arriving at a destination which can be time consuming and difficult in situations where arrival time and destination are uncertain. These systems either require a large investment in infrastructure or lack the flexibility to allow a driver to instantaneously locate available parking upon arrival at a destination. What is needed is a system and method of locating available parking instantaneously as it becomes available.

SUMMARY

In view of the current systems and their limitations, the invention is a method of locating an available vehicle parking space. In the method, parked information indicative of a parked condition is stored in a first vehicle. The first vehicle may detect a change in condition from the parked condition to a vacating condition. The first vehicle then communicates the change in condition from the first vehicle to a neighboring searching vehicle and the searching vehicle detects the change.

BRIEF DESCRIPTION OF THE FIGURES

The invention will now be described by way of example with reference to the accompanying figures of which:

FIG. 2 is a schematic diagram of one of the arrangements of FIG. 1 wherein a sequence according to the invention is illustrated;

FIG. 3 is a block diagram of the system according to the invention;

DETAILED DESCRIPTION OF THE EMBODIMENTS

Figure 1:
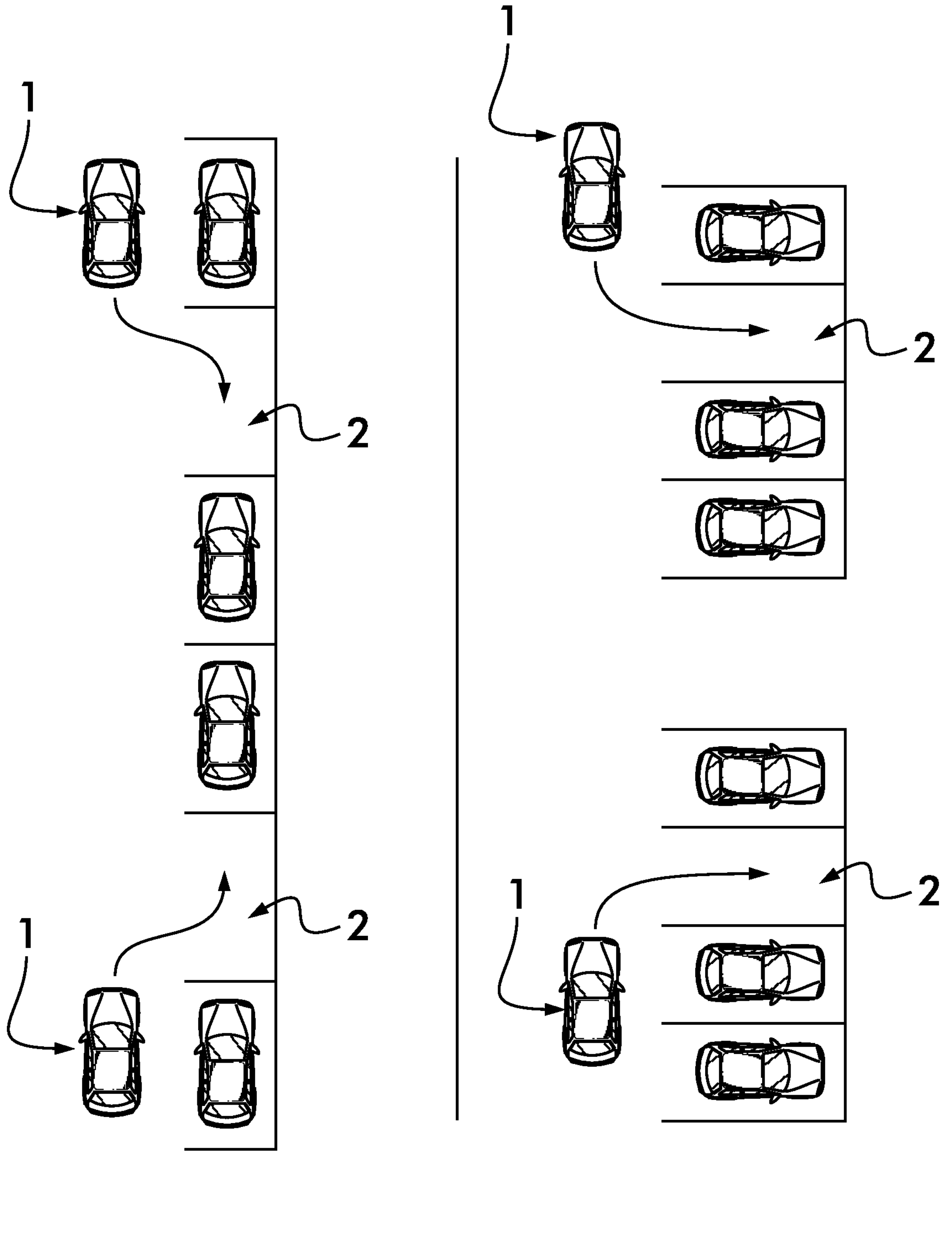
FIG. 1 is schematic diagram of various parking arrangements.

The invention generally is a method of locating an available parking space. Referring first to FIGS. 1 and 2, the method involves a first vehicle 1 which is parked and, upon vacating its parking space, it signals neighboring vehicles 3, as indicated by the dashed line, that a space is being vacated and is therefore available. The major steps in the method are to store in a first vehicle 1 parked information indicative of a parked condition, detect in the first vehicle 1, a change in condition from the parked condition to a vacating condition, communicate the change in condition from the first vehicle 1 to a neighboring searching vehicle 3 wherein the searching vehicle 3 detects the change in condition of the first vehicle.

In the first vehicle 1, various on board vehicle sensors gather data which is available on a vehicle data bus 10. For example, sensors S1 . . . Sn may sense vehicle direction, speed, steering angle, engine start and stop, braking, time, vehicle location, etc. This data may be readily accessed off of the data bus, recorded by an on board event recorder or processor and associated memory and used as an input to a vehicle parking space system. As best shown in FIG. 3, the system includes a processor 20 linked to the vehicles data bus 10. Sensors S1 . . . Sn feed data to the vehicles data bus 10. Such data may include but is not limited to static steering information, a series of steering maneuvers, direction of travel, engine sequence information, location of the vehicle, or operating parameters. The processor 20 may consist of a small ARM core, or x86, or any suitable special purpose or general purpose processor. The processor 20 is linked to the data bus 10 and has available to it all the data gathered by the sensors S1 . . . Sn. Utilizing the data, the processor 20 makes determinations of a parked condition by evaluating the vehicle behavior like steering sequence, direction sequence, speed, engine stop/start etc. Both the data and the parked condition may be stored in memory associated with the processor. It should be understood that such memory is a part of the processor 20 for the purpose of simplifying the Figure but one skilled in the art would appreciate that the memory may take other forms and may be separate from the processor 20. The processor 20 also determines a change in vehicle condition when the vehicle is cranked and then vacates a parking space. Once again, the processor 20 utilizes singular or plural pieces of data from the data bus 10, like steering, speed, direction, or a sequence involving one or all of these pieces of data to determining that the vehicle has changed condition by vacating a parking space. This shall be referred to here as the vacating condition.

Figure 5:
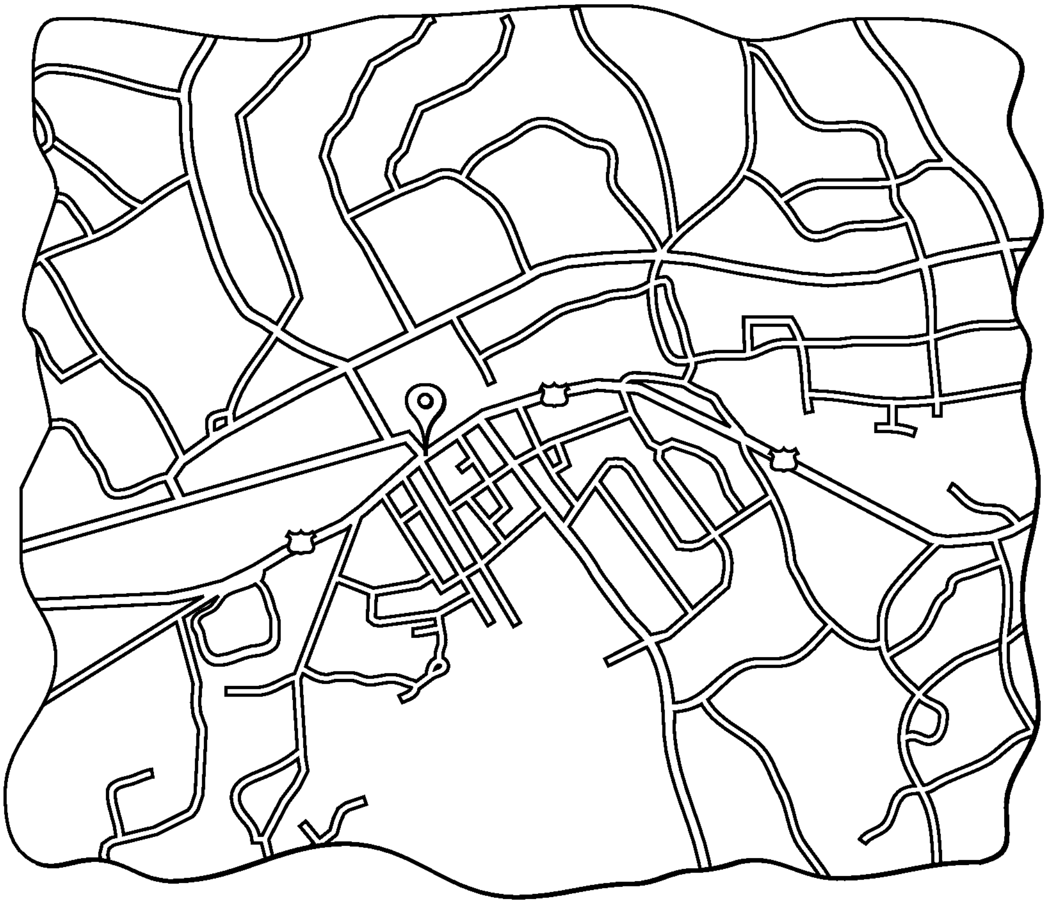
FIG. 5 shows an example map with vacant spots on it.

A communication link 30 is operatively coupled to the processor 20 for transmitting the change of condition (i.e. parked or vacating) to neighboring searching vehicles 3. The communication link may include but is not limited to a transmitter/receiver using a WiFi protocol. Alternatively, cell phone networks (3G/4G) can be used for sending and receiving the data. Aggregation and post processing could be done on the server side support or in the cars by utilizing e.g. Point2 Multipoint cell broadcast technology. Once a change in condition is determined by the processor 20, the communication link 30 transmits the change and a searching vehicle 3 receives that transmission. The transmission includes the change in condition as well as the location of the vehicle 1 vacating the parking space. In the searching vehicle 3, an indication of the location is displayed, like for example, in a map shown the vacated space on a GPS display (FIG. 5). Other indications in the searching vehicle 3 are anticipated by and included in the invention. This can be as simple as a compass with a distance indicator or as sophisticated as an intelligent navigation system which recognizes that the destination has been reached and helps finding a spot by offering the three or a plurality of closest options in the direction of driving.

A listing of available vacated spaces may be received through, for example, a cellular modem and stored by a central server which receives data from the communication link 30. That server may send periodic updates to searching vehicles 3 so that all have displayed the same listing of available spaces. Alternatively, the searching vehicle may create and store listings of available spaces from data received directly from the communication link 30 without the need for the described server. The searching vehicle 3 may also communicate with other searching vehicles in the area to sync up their respective received data or lists. Lists in respective searching vehicles 3 may expire after a specified time and then be removed from the list assuming that spaces are generally filled within the specified time. Open space listings may be limited to only those spaces within a specified radius from the present location of the searching vehicle3. This may be accomplished by communication link 30 being configured to transmit to a limited area where searching vehicles are likely to be located or by processing in the searching vehicle 3. Alternatively, in the server arrangement described above, the vehicle 1 could send the vacant spot to a database. This server data base with enabled geofencing algorithms can collect all vacant spots at any given time and only push certain spots back to searching vehicles 3 that are in the right area, since it knows where the searching vehicles 3 are and where the vacant spots are relatively to the searching vehicles 3. Limiting the area may also be accomplished by many other means. For example, the searching vehicle 3 may be equipped with all the same components as the vacating vehicle 1 so if can determine when it has been parked and when it is vacating a space. For the purpose of this description, once the searching vehicle 3 is parked then it should be understood that it can perform all the described functions as the vacating vehicle 1 to begin the process again.

Figure 4:
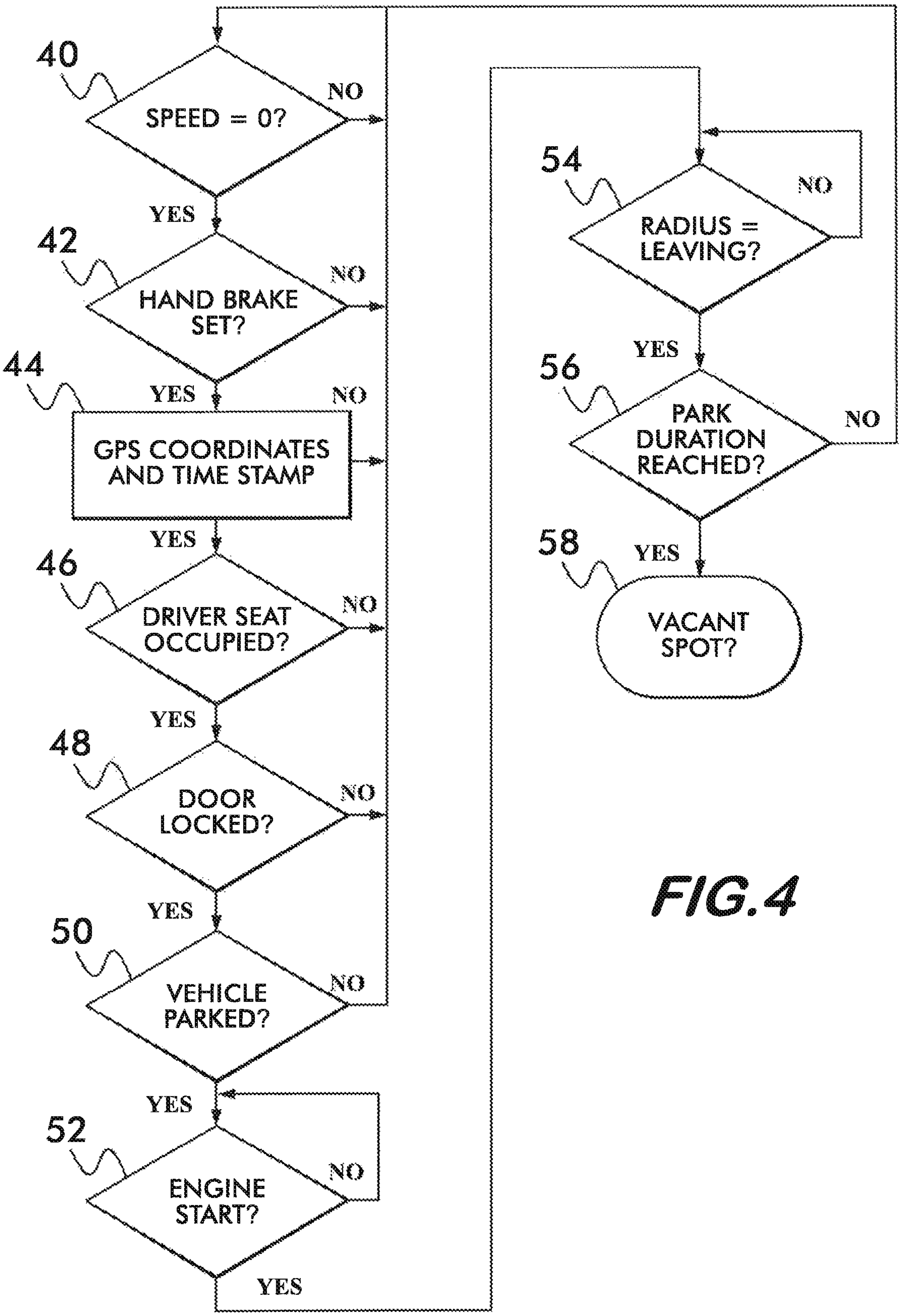
FIG. 4 is a flow diagram of a process utilized by the method of the invention.

An algorithm for locating and filling spaces will now be described in greater detail with reference to FIG. 4. The algorithm begins at step 40 by first checking whether the vehicle is moving. If the vehicle speed is zero, flow proceeds to step 42 wherein the algorithm checks to see if the handbrake is set. This condition is met GPS coordinates and timestamp are applied to the data at step 44 and then the driver seat is checked at step 46. If the driver seat is occupied, flow proceeds to step 48 wherein the door lock is checked. If the door is locked, flow proceeds to step 50 wherein if the conditions in steps 40-48 have been met, a vehicle parked flag is set to "y". If any of the conditions of steps 40-48 have not been met, flow returns to step 40 to continue checking whether the vehicle has been parked. If a vehicle parked condition is achieved at step 50, flow proceeds to step 52 wherein the vehicle repeatedly checks whether the engine has started. If not started, flow loops back to step 52 until the engine start criteria is met to pass flow next to step 54 where steering wheel radius is checked. If the wheel radius does not meet a leaving condition, then flow loops back to step 54. Once the leaving condition is met, flow passes to step 56 where a parked duration time is checked. If in step 56, a parked duration time is reached to differentiate from a mere vehicle stop, then a vacant spot condition is achieved at step 58 and the vacating vehicle 1 communicates the vacant spot condition over the communication link 30. As described above, each time a vehicle stops, this algorithm begins at step 40 again.

The invention therefore advantageously provided drivers with a simple way to instantaneously detect the availability of a parking space or parking spaces. It should be understood by those skilled in the art that many variations of the methods and system described here are within the spirit and scope of the invention. Therefore the invention is intended to be limited only by the following claims.

I claim:

1. A method of locating an available vehicle parking space comprising the steps of:

storing in memory a first vehicle steering information indicative of a parked condition;

detecting in the first vehicle a change in condition from the steering information to a vacating condition using a processor;

communicating the change in condition from the first vehicle and a location of the available vehicle parking space to a neighboring searching vehicle using a communication link, when the processor detects the change in steering information from the parked condition; and, detecting the change in the searching vehicle and the location of the available vehicle parking space using the communication link;

wherein the communication link pushes the location of the available vehicle parking space which is received by the searching vehicle when positioned within a specified radius from the location of the available vehicle parking space.

2. The method of claim 1, wherein the steering information comprises one or more steering maneuvers.

3. The method of claim 1, further comprising the step of storing in the memory of the first vehicle direction of travel and engine sequence information.

4. The method of claim 1, further comprising the step of storing in the memory of the first vehicle engine operating parameters.

5. The method of claim 1, wherein the change in condition further comprises engine cranking.

6. The method of claim 1, wherein the change in condition further comprises a speed change.

7. The method of claim 1, wherein the change in condition further comprises a direction change.

8. The method of claim 1, wherein the change in condition comprises a series of changes having at least two changes including a steering change and another change selected from the group of, engine cranking, speed, and direction.

9. The method of claim 1, wherein communicating is limited to a geographical area surrounding the first vehicle.

10. The method of claim 1, wherein detecting comprises displaying in the searching vehicle, the location.

11. The method of claim 1, wherein detecting comprises displaying in the searching vehicle, an indication of direction toward the location.

12. The method of claim 11, wherein detecting comprises displaying in the searching vehicle, a distance to the location.

13. A system for locating an available vehicle parking space comprising:

a sensor positioned in a first vehicle to collect data associated with a position of a steering wheel in a parked condition or a vacating condition of the first vehicle;

a processor connected to the sensor that uses the position of the steering wheel to determine when the first vehicle is in the parked condition or the vacating condition;

a memory associated with the processor;

a transmitter associated with the memory, the transmitter transmitting data from the memory to a limited area within a specified radius from a location of the available vehicle parking space;

a receiver located in a second vehicle; and a display associated with the receiver, the display having an indication of direction to the first vehicle.

14. The system of claim 13, wherein the display comprises an indication of distance to the first vehicle.

15. The system of claim 13, wherein the display comprises an indication of a location of the first vehicle.

16. The system of claim 13 wherein the sensor is selected from the group of a speed sensor, a direction sensor, a steering wheel angle sensor, and an engine sensor.

17. A method of locating an available vehicle parking space comprising the steps of:

storing in memory a first vehicle parked information indicative of a parked condition;

detecting in the first vehicle a change in condition from the parked condition to a vacating condition using a processor;

communicating the change in condition from the first vehicle and a location of the available vehicle parking space to a neighboring searching vehicle using a communication link, when the processor detects the change in condition from the parked condition; and, detecting the change in the searching vehicle and the location of the available vehicle parking space using the communication link;

wherein (a) the communication link pushes the location of the available vehicle parking space which is received by the searching vehicle when positioned within a specified radius from the location of the available vehicle parking space, and (b) the change in condition comprises a series of changes having at least two changes including a steering change and another change selected from the group of engine cranking, speed, and direction.

* * * * *